US006236525B1

United States Patent
Cates et al.

(10) Patent No.: US 6,236,525 B1
(45) Date of Patent: May 22, 2001

(54) TAPE HEAD WITH PATTERN TIMING FOR SERVO WRITING APPLICATION

(75) Inventors: James C. Cates; Richard H. Dee, both of Louisville; Ronald D. Gillingham, Longmont; John P. Mantey, Boulder; Richard L. O'Day, Boulder; Steven G. Trabert, Boulder, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/134,442

(22) Filed: Aug. 14, 1998

(51) Int. Cl.[7] ........................................................ G11B 5/09
(52) U.S. Cl. .......................... 360/51; 360/75; 360/77.12; 360/121
(58) Field of Search ................................ 360/51, 57, 119, 360/121, 75, 77.12, 48

(56) References Cited

U.S. PATENT DOCUMENTS

| | | | |
|---|---|---|---|
| 4,472,750 | * | 9/1984 | Klumpp et al. ................ 360/78.02 X |
| 5,602,703 | * | 2/1997 | Moore et al. ................ 360/77.12 X |
| 5,963,400 | * | 10/1999 | Cates et al. .......................... 360/113 |
| 6,061,196 | * | 5/2000 | Kalfs et al. .................... 360/77.12 X |
| 6,134,070 | * | 10/2000 | Tran et al. .............................. 360/75 |

* cited by examiner

Primary Examiner—Andrew L. Sniezek
(74) Attorney, Agent, or Firm—Brooks & Kushman P.C.

(57) ABSTRACT

A servo track writer head writes servo tracks on a data storage tape with increased accuracy. The servo track writer head includes a leading writer for each servo track. Each leading writer writes a synchronization field on the tape. The servo track writer head also includes a sequence of trailing writers for each servo track. Each trailing writer produces at least one trailing field on the tape a fixed distance behind the synchronization field. The servo track writer head also includes one timing writer. Each timing writer writes a timing field on the tape at a timing distance in the tape direction from each of the synchronization fields. The servo track writer head also includes a sequence of timing readers corresponding to each timing writer. The number of timing readers in the sequence is equal to the number of trailing writers in the sequence of trailing writers. Each timing reader reads the timing field on the tape written by the corresponding timing writer and generates a signal used to initiate writing of corresponding trailing fields. The positioning of timing readers permits the appropriate fixed distance behind synchronization fields for writing trailing fields to be determined.

17 Claims, 4 Drawing Sheets

TAPE HEAD WITH PATTERN TIMING FOR SERVO WRITING APPLICATION

TECHNICAL FIELD

The present invention relates to writing servo tracks on magnetic storage tape.

BACKGROUND ART

Magnetic tape provides a reliable, cost-efficient, and easy to use means for information storage and retrieval. Ongoing efforts to increase the usefulness and cost-effectiveness of magnetic tape include increasing the ability to store more information for a given width and length of tape. This is generally accomplished by including more data tracks on a given width of tape. Increasing the number of data tracks requires those tracks to be more densely packed onto the tape. As the data tracks are more closely spaced, errors may be more easily introduced into the reading or writing of data. Therefore, an increase in the precision of positioning the tape with respect to the head becomes more critical. The positioning of the tape on the tape head may be affected by variations in the tape or the tape head, and in variations in tape positioning caused by air flow, temperature, humidity, tape shrinkage, and other factors, especially at the outside edges of the tape.

Servo tracks are employed to provide increased accuracy in the placement of data tracks on tape. The one or more servo tracks provide a reference point to maintain correct positioning of the tape head with respect to the tape. Each servo track may have various patterns or frequency regions to allow precise positioning between the tape head and the tape. Servo tracks are generally placed on the tape during tape manufacture and are used by a tape deck to align the read and write heads with the tape. Each servo track may comprise a sequence of one or more servo frames.

Because the servo tracks control precise read and write head positioning, the size and location of servo track fields have a strict tolerance. Also, because the servo pattern will be written in a manufacturing environment, the servo writer head must be capable of writing the patterns in one pass of the tape at high tape speed. Various portions of the servo track pattern are written by different modules in a servo write head. Inaccuracies in pattern size and location may result from variations in tape velocity as the tape passes over the servo write head, in improper gap-to-gap parallelism and azimuth in module location, because the tape is skewed over the servo writer head, or the like. What is needed is to determine the precise position of the tape at each module with respect to the reference module.

SUMMARY OF THE INVENTION

It is an object of the present invention to provide increased accuracy in writing servo tracks on magnetic storage tape.

Another object of the present invention is to minimize the effects of velocity variations of tape passing over the servo write head.

Still another object of the present invention is to minimize gap-to-gap parallelism and azimuth errors in servo track write heads.

Yet another object of the present invention is to minimize the effects of tapes skewed over servo track write heads.

In carrying out the above objects and other objects and features of the present invention, a servo track writer head is provided. The servo track writer head writes servo tracks spaced across the width of a data storage tape as the tape moves along the head in a tape direction, each servo track written along a portion of the tape length. The servo track writer head includes a leading writer for each servo track. Each leading writer writes a synchronization field on the tape at the same tape position in the tape direction as every other leading writer. The servo track writer head also includes a sequence of trailing writers for each servo track. Each trailing writer produces at least one trailing field on the tape. Each trailing field is written a fixed distance in the tape direction behind the synchronization field. Each trailing writer at a particular location in the sequence of trailing writers is positioned at the same distance in the tape direction from a selected leading writer as every other trailing writer at that particular location in the sequence of trailing writers. The servo track writer head also includes at least one timing writer. Each timing writer writes a timing field on the tape at a timing distance in the tape direction from each of the synchronization fields. Further, the servo track writer head includes a sequence of timing readers corresponding to each timing writer. Each timing reader reads the timing field on the tape written by the corresponding timing writer. The number of timing readers in the sequence of timing readers is equal to the number of trailing writers in the sequence of trailing writers. Each timing reader at a particular location in the sequence of timing readers is located the timing distance in the tape direction from the trailing writer having the same particular location in the sequence of trailing writers. The positioning of timing readers permits locations of timing fields to be read, allowing the appropriate fixed distance behind synchronization fields for writing trailing fields to be determined.

In a preferred embodiment, each synchronization field and each timing field is written simultaneously.

In another embodiment, the last trailing writer in each sequence of trailing writers is a track identification writer. Each of the remaining trail of writers in the sequence of trailing writers is an erase writer. Each trailing field is an erased field. In a refinement, the remaining trailing writers are a first erase writer and a second erase writer.

In still another embodiment, a first tape edge and a second tape edge define the tape width. A first timing writer is located closer than any leading writer to the first tape edge. A second timing writer is located closer than any leading writer to the second tape edge.

In yet another embodiment, the fixed timing distance is zero, thereby aligning the start of each timing field with the start of each synchronization field along the tape length.

In a further embodiment, each of the timing writers is a thin film writer including a bottom pole, a top pole, an insulating gap layer interposed between the bottom pole and the top pole, and a plurality of coils between the top and bottom poles. The bottom pole and the top pole form an electromagnet driven by current in the coils. In a refinement, at least one trailing writer has a split top pole, each split top pole trailing writer writing at least two trailing fields simultaneously.

In a still further embodiment, each timing reader is an inductive reader or a magnetoresistive reader.

In yet a further embodiment, each timing writer and each leading writer are constructed on a single substrate. Each timing reader at a particular location in the sequence of timing readers and each trailing writer having the same particular location in the sequence of trailing writers are also constructed on a single substrate.

In yet a still further embodiment, each timing writer writes the timing field at a first frequency. Each timing writer writes a second field following the timing field, the second field including a signal at a second frequency. Each timing reader detects the transition between the timing field and the second field and detects periods of the second frequency signal. The number of periods detected is used to determine the appropriate fixed distance behind synchronization fields for writing trailing fields.

A method for writing at least one servo track on a magnetic storage tape moving relative to a head is also provided. Each servo track has a synchronization field followed by a sequence of trailing field patterns extending for a portion of the tape length. The method includes writing a synchronization field on the tape for each servo track, writing at least one timing field on the tape a fixed distance from a select synchronization field, reading each timing field from the tape, and writing the next trailing field pattern in the sequence on the tape for each servo track. Each of the next trailing field patterns has a location based on when each timing field is read. Reading each timing field and writing the next trailing field pattern in the sequence is repeated until each trailing field pattern in the sequence is written on the tape.

In an embodiment, a servo frame includes a synchronization field followed by a sequence of trailing field patterns extending for a portion of the tape length. Each servo track includes a sequence of servo frames. The method further includes repeating, for each servo frame in the sequence of servo frames, writing a synchronization field, writing at least one timing field, reading each timing field, writing the next trailing field pattern, and repeating reading each timing field and writing the next trailing field pattern in the sequence until each trailing pattern in the sequence is written on the tape.

In another embodiment, a first timing field is written closer to the first tape edge than any of the servo tracks and a second timing field is written closer to the second tape edge than any of the servo tracks. In a refinement, writing the next trailing field pattern in the sequence includes determining a skew value as the difference between when the first timing field is read and when the second timing field is read and includes writing at least one trailing field on the tape for each servo track, the location of each trailing field along the tape length based on the skew value.

In still another embodiment, writing timing fields includes writing a first timing field having a signal at a first frequency and writing a second timing field following the first timing field, the second timing field including a signal at a second frequency. In a refinement, reading each of the timing fields from the tape includes detecting the transition between the first timing field and the second timing field and detecting each period of the second signal following the transition. The number of periods of the second signal following the transition is used to determine the location for writing the next trailing field pattern on the tape.

The above objects and other objects, features and advantages of the present invention are readily apparent from the following detailed description of the best modes for carrying out the invention when taken in connection with the accompanying drawings.

BEST MODES FOR CARRYING OUT THE INVENTION

Figure 1:
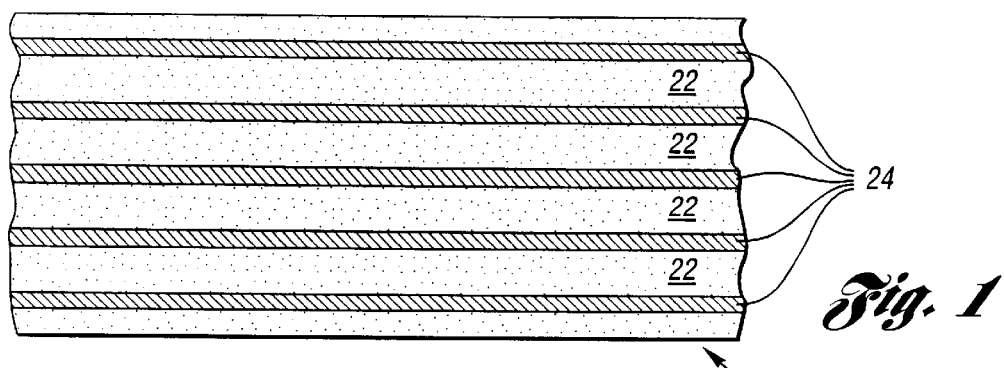
FIG. 1 is a schematic diagram of a magnetic storage tape showing five servo tracks.

Referring now to FIG. 1, a schematic diagram of a magnetic storage tape with five servo bands is shown. Magnetic storage tape 20 includes a plurality of data bands 22 separated by servo bands 24. A one-half inch wide tape 20 may contain 288 or more data tracks on multiple data bands 22. To improve data read and write function performance, it is desirable to include servo bands 24 spaced across the width of tape 20 each servo band 24 may include one or more servo track written along a portion of the length of tape 20.

Figure 2:
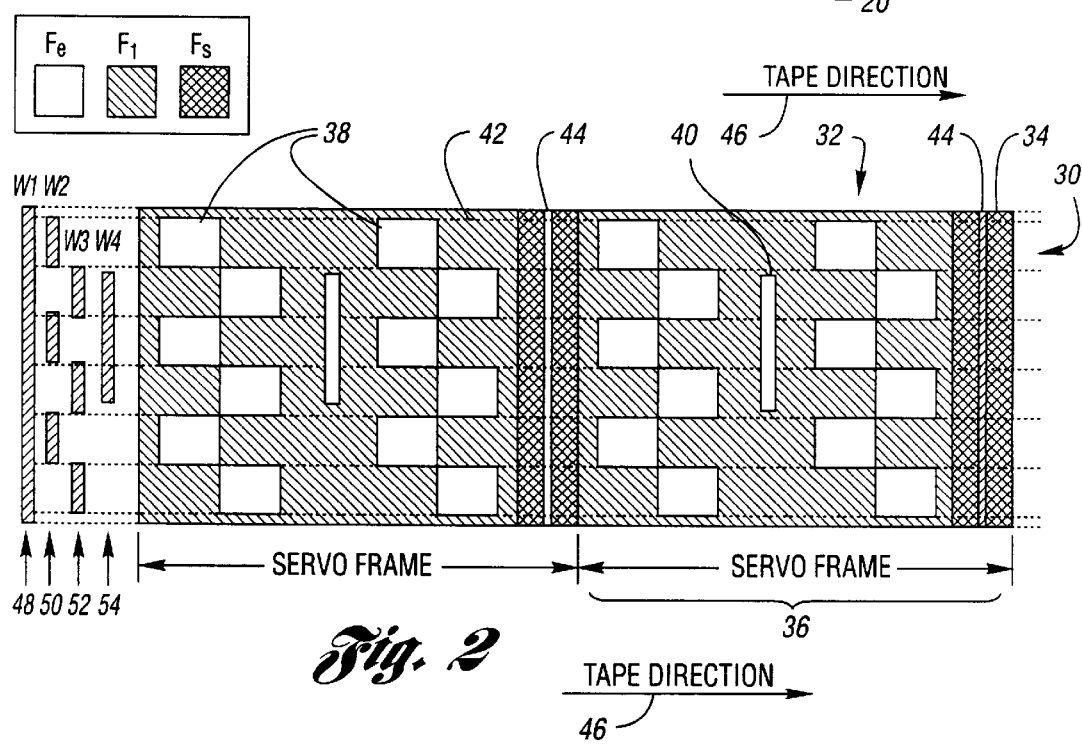
FIG. 2 is a schematic diagram showing a servo track with two servo frames, each frame having a synchronization field, erase fields, and a track identification mark.

Referring now to FIG. 2, a schematic diagram of a servo track with two servo frames is shown. Servo track 30 includes a sequence of one or more servo frames 32. Each servo frame 32 begins with a synchronization field 34 extending across the width of servo frame 32 followed by one or more trailing fields 36. Trailing field 36 includes one or more erased field 38, preferably arranged in a checker board pattern, and a track identification field 40.

Background field 42, known as field $F_f$, is made by writing a first frequency across the width of servo frame 32. Synchronization field 34, known as $F_s$, is made by writing a second frequency across the width of servo frame 32. In one embodiment, the second frequency is approximately double that of the first frequency. Additional information, such as longitudinal data 44, may be included within synchronization field 34. Longitudinal data 44 is written across the width of servo frame 32 as tape 20 moves in tape direction 46 and indicates either a logical one or a logical zero. For example, a short erased region may indicate a logical zero and a short region onto which is written a signal at the first frequency may indicate a logical one. Longitudinal data 44 from a sequence of synchronization fields 34 may be used to indicate position along the length of tape 20.

Each erased field 38, known as field $F_e$, is created by erasing a pattern in background field 42. This may be either an AC erase, in which case erased field 38 is overwritten by a high frequency signal, or may be a DC erase in which case erased field 38 is overwritten by a constant DC signal. Erased fields 38 are used by a head in a tape deck to determine the relative location across the width of tape 20 of the tape deck head. As a read head in the tape deck head moves over erased field 38, the strength of the signal read is proportional to the portion of the read head that is over background field 42 and not over erased field 38. The strength of the read signal is then used to determine the relative position of the read head across the width of tape 20. In this manner, fine adjustments in the position of the tape deck head across the width of tape 20 can be made.

Track identification field 40 is created by erasing a particular width in background field 42 within a region of length of servo frame 32. Track identification field 40 may be located at different positions across the width of servo track 30. Track identification fields 40 identifies servo track 30 that the tape deck read head is operating on. An example can be seen in FIG. 8 below. In this manner, verification of coarse tape head position across the width of tape 20 can be determined.

The size and position of synchronization field 34 and trailing fields 36 is critical to the correct operation of tape 20. The size and relative location of fields 34,36 are determined by the location and width of the individual servo writers as indicated by W1, W2, W3, and W4. Servo writer W1 48 determines the width of servo track 30 and, hence, of synchronization field 34. Servo writer W2 50 determines the width and lateral locations of half the erased fields 38 in the checker board pattern. Servo writer W3 52 determines the width and lateral locations of the other half of erased fields 38. Servo writer W4 54 determines the width and lateral location of track identification field 40. The length and longitudinal position of fields 34,36 are determined by when signals are applied to servo write heads, the duration of the applied signal, and the speed at which tape 20 moves over servo write heads. The actual spacing between writers 48, 50, 52, 54 is much greater than the length of servo frame 32.

Figure 3:
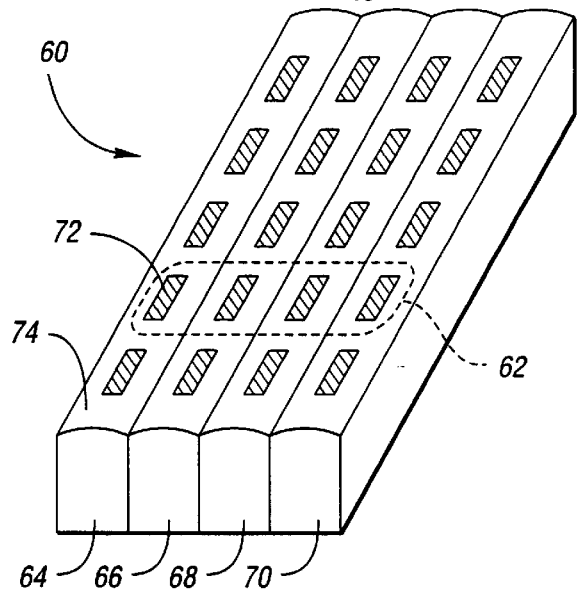
FIG. 3 is a conceptualized drawing of a servo writer tape head having four modules that may be used to produce the servo tracks shown in FIGS. 1 and 2.

Referring now to FIG. 3, a conceptualized drawing of a servo writer tape head that may be used to produce the servo tracks of FIGS. 1 and 2 is shown. Servo writer head 60 includes one or more zones, one of which is indicated by 62, each zone 62 is responsible for writing one servo track 30 as tape 20 moves across head 60 in tape direction 46. Servo writer head 60 is divided into modules 64, 66, 68, 70, one module for each individual servo writer pattern. Each module 64, 66, 68, 70 includes one or more writers, one of which is indicated by 72, for each zone 62. Leading writer module 64 includes writers 72 of the W1 servo writer 48 variety for each servo track 30. First erase module 66 contains writers 72 of the W2 servo writer 50 variety. Second erase module 68 includes writers 72 of the W3 servo writer variety 52. Track identification writer module 70 includes writers 72 of the W4 servo writer 54 variety. Each module 64, 66, 68, 70 consists of a substrate, for example, ferrite or aluminum titanium carbide (AlTiC), on which write heads are built using conventional thin film head processes. These substrates may then be glued or otherwise physically joined with a closure to provide structural support as is known in the art. Each module 64, 66, 68, 70 includes an upper surface, one of which is shown by 74, which is formed to provide a contour suitable for tape as is known in the art.

Figure 4:
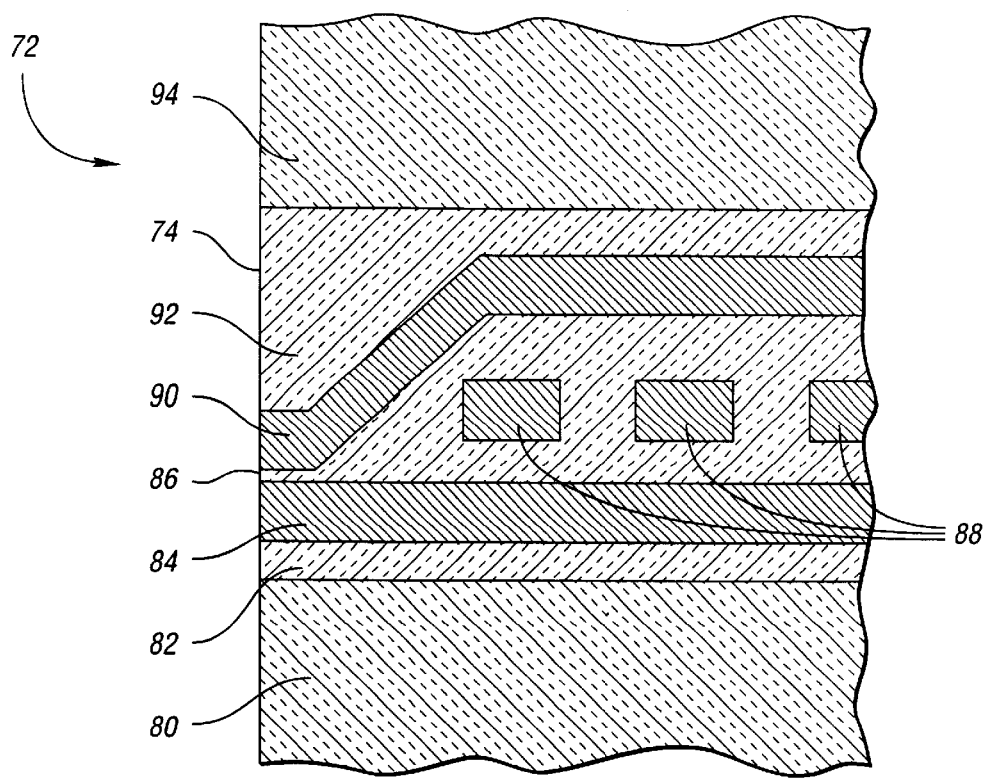
FIG. 4 is a conceptualized cross-sectional drawing of a writer that may be incorporated in the servo writer head of FIG. 3.

Referring now to FIG. 4, a conceptualized cross-sectional drawing of a portion of a tape head writer that may be incorporated in the servo writer head of FIG. 3 is shown. Writer 72 is constructed on substrate 80 which may be made of, for example, AlTiC. Under layer 82, which may be made from an insulating material such as alumina, is deposited on substrate 80. Magnetic bottom pole 84 is deposited on under layer 82. Gap layer 86, made of an insulating material such as alumina, is deposited on bottom pole 84. Magnetic top pole 90 is formed on top of gap layer 86. Conductive coil structure 88 is formed between bottom pole 84 and top pole 90. Overcoat layer 92 is deposited on top of top pole 90 and mechanically lapped back to form a flat surface for receiving closure 94. Closure 94 may be made of AlTiC or other suitable material. Bottom pole 84 and top pole 90 form an electromagnet driven by current in coil structure 88. Tape 20 passing over upper surface 74 can therefore be written or erased by the application of an appropriate signal to the plurality of coils in coil system 88.

Figure 5:
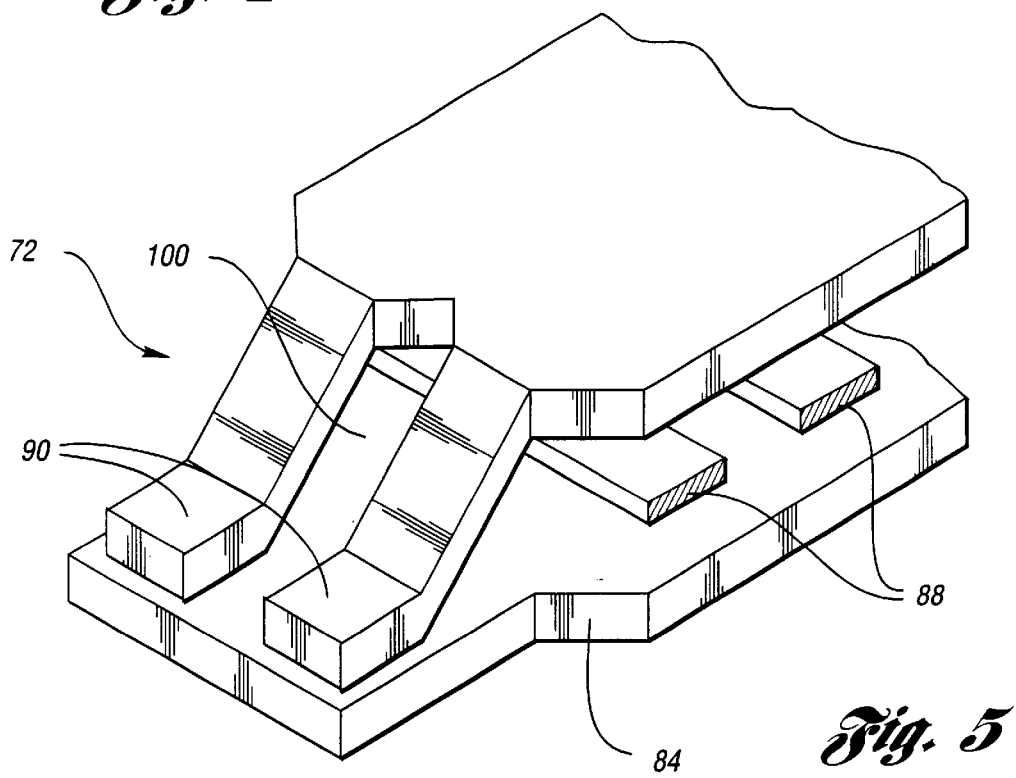
FIG. 5 is a conceptualized view of a split-pole writer that may be incorporated in the servo writer head of FIG. 3.

Referring now to FIG. 5, a conceptualized view of a split-pole writer head that may be incorporated in the servo writer head of FIG. 3 is shown. Top pole 90 has had a region of material, generally indicated by 100, removed to produce split-top pole 90. Writer 72 with split-top pole is able to write more than one erase field 38 simultaneously. By shaping either top pole 90, bottom pole 84, or both, individual writers 48, 50, 52, 54 can be produced. For example, W2 servo writer 50 can be produced by writer 72 having top pole 90 divided into three split poles.

Figure 6:
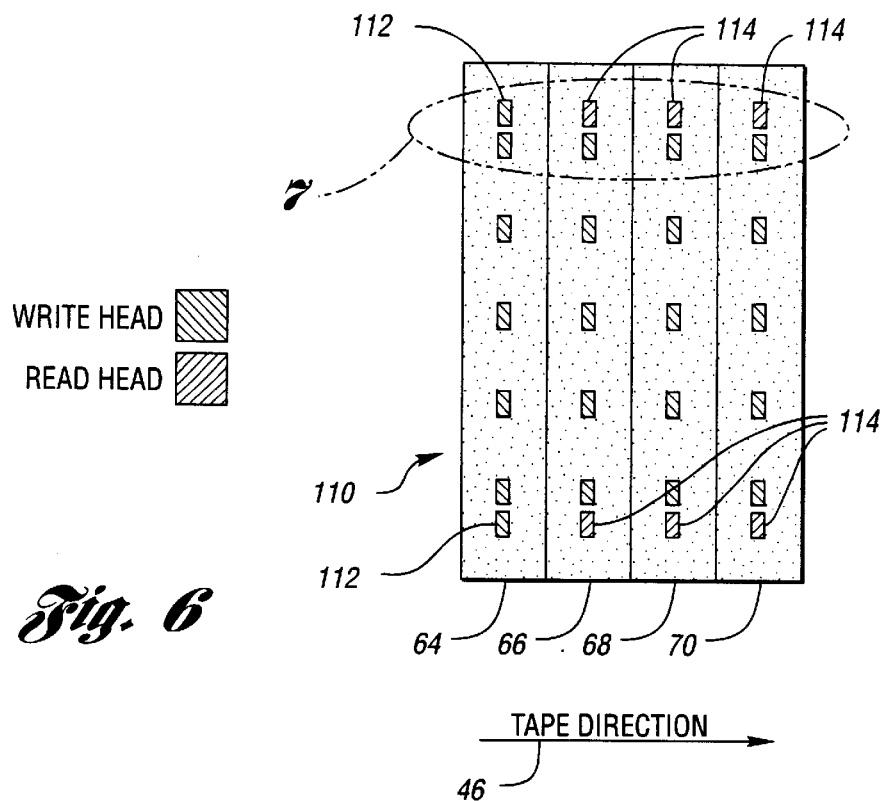
FIG. 6 is a schematic diagram of an embodiment of a servo writer head according to the present invention.

Referring now to FIG. 6, a schematic diagram of an embodiment of a servo writer head according to the present invention is shown. Servo writer head 110 is similar in operation to servo writer head 60 described with regards to FIG. 3 above except for the addition of one or more timing writer 112 and one or more timing reader 114. Leading writer module 64 includes at least one timing writer 112. Each trailing module 66, 68, 70 includes timing reader 114 corresponding to each timing writer 112 in leading writer module 64. Each timing writer 112 can write a timing field on tape 20. Each timing reader 114 is positioned to read a timing field written by a corresponding timing writer 112. If timing writer 112 produces a timing signal synchronized with synchronization field 34, then timing reader 114 reading the timing field can be used to accurately determine when trailing fields 36 should be written.

Figure 7:
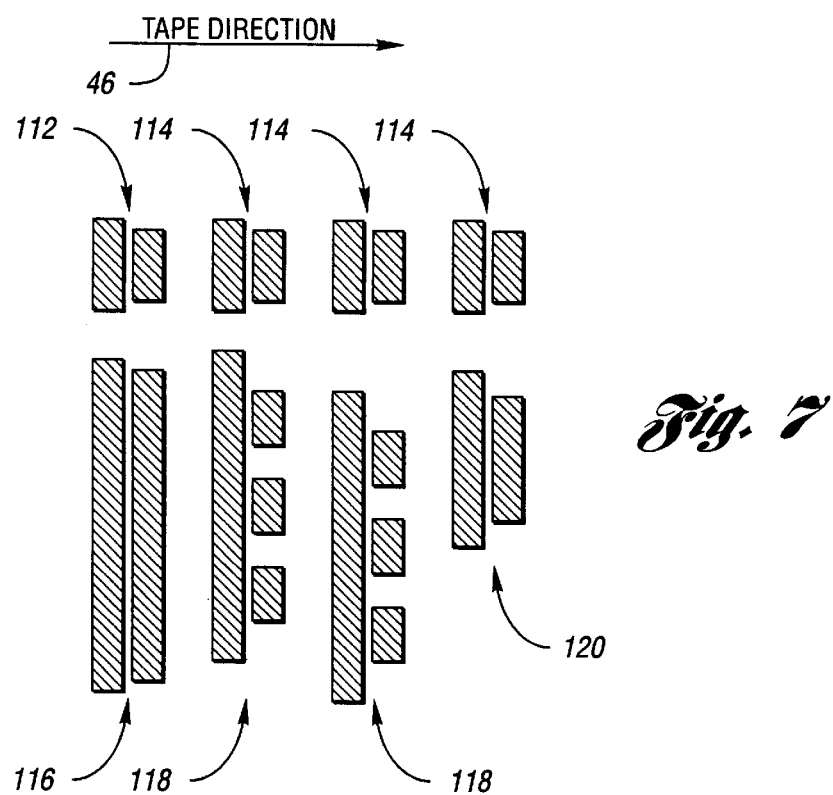
FIG. 7 is a schematic diagram showing the relative positioning of writers and read heads associated with one timing track and one servo track produced by the servo writer head of FIG. 6.

Referring now to FIG. 7, a schematic diagram showing the relative positioning of read and write heads associated with one timing track and one servo track produced by servo writer head 110 is shown. Leading writer 116 is operable to produce synchronization field 34. Two erase writers 118 are used to create checker board erased fields 38. Track identification writer 120 produces track identification field 40. Timing writer 112 produces a timing track, a leading edge of which is detected by timing readers 114. Timing writer 112, leading writer 116 and track identification writer 120 may be constructed as described with regards to FIG. 4 above. Erase writers 118 have split-top poles described with regards to FIG. 5 above. Timing readers 114 are illustrated as inductive readers but may be magnetoresistive readers as is well known in the art.

Figure 8:
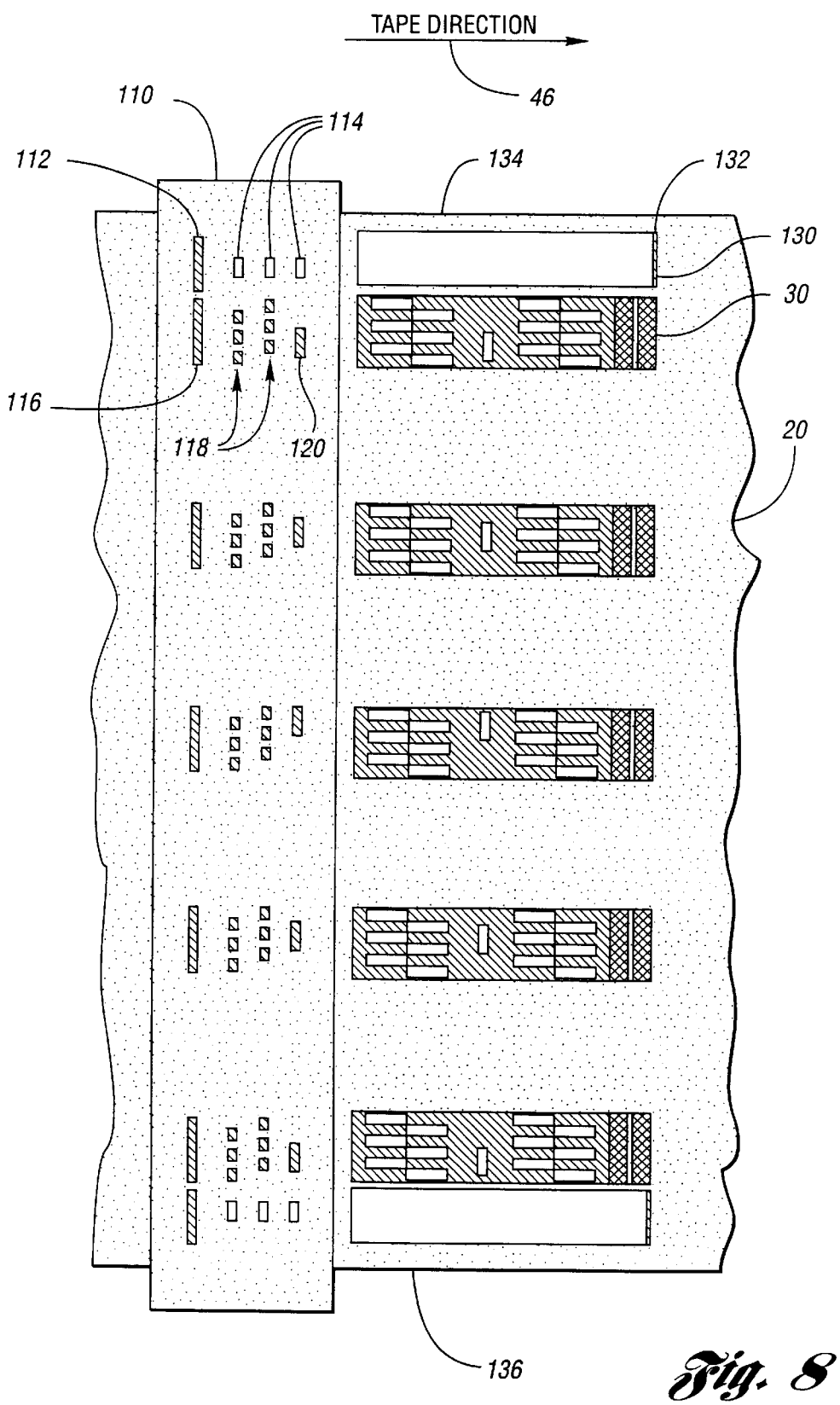
FIG. 8 is a schematic diagram showing an embodiment of a servo track writer head and the resulting servo tracks written on a tape according to the present invention.

Referring now to FIG. 8, a schematic diagram showing an embodiment of a servo track writer head and a resulting servo tracks and timing tracks written on a tape according to the present invention are shown. Tape 20 moves over servo writer head 110 in tape direction 46. Servo writer head 110 writes servo tracks 30 and timing tracks 130 on tape 20 as tape 20 moves over servo writer head 110.

In operation, each leading writer 116 writes synchronization field 34 on tape 20 for each servo frame 32 of servo track 30. Coordinated with writing each synchronization field 34, each timing writer 112 writes timing field 132 at the start of timing track 130 on tape 20. In the embodiment shown, the start of synchronization field 34 and timing field 132 are aligned along the length of tape 20. In an alternative embodiment, timing track 130 is offset from synchronization field 34 by a fixed timing distance in the tape direction. When timing field 132 moves under timing reader 114, timing reader 114 reads timing field 132. The appropriate trailing field 36 is written by erase writer 118 or track identification writer 120 based on when corresponding timing reader 114 detects timing field 132. If the fixed timing distance is not zero, the timing field detection by timing reader 114 may occur prior to activation of corresponding writer 118,120. This offset may allow time for computations and adjustments prior to writing trailing fields 36.

In an embodiment of the present invention, each timing writer 112 writes timing field 132 at a first frequency. Each timing writer 112 writes a second field following timing field 132 at a second frequency. Timing reader 114 detects the transition between timing field 132 and the second field. Timing reader 114 is then used to count periods of the signal at the second frequency. The period count is used to determine when to activate corresponding writer 118, 120.

In a preferred embodiment, two timing writers 112 and associated sequence of timing readers 114 are used in servo writer head 110. A first timing writer 112 writes first timing track 130 on tape 20 closer to tape top edge 134 than any servo track 30. A second timing writer 112 writes second timing track 130 on tape 20 closer to tape bottom edge 136 than any servo track 30. A skew value can be determined as the difference between when the first timing field is read by a first timing reader 114 and when the second timing field is read by a second timing reader 114 in the same module 66, 68, 70. The corresponding trailing field 36 can then be written on tape 20 for each servo track 30 based on the skew value, thereby compensating for problems such as improper azimuth between leading writer module 64 and trailing modules 66, 68, 70.

FIG. 8 is a conceptualized drawing. The actual spacing in tape direction 46 between elements 112, 114, 116, 118, 120 is much greater than the length of servo frame 32.

While the best modes for carrying out the invention have been described in detail, other possibilities exist within the spirit and scope of the present invention. Those familiar with the art to which this invention relates will recognize various alternative designs and embodiments for practicing the invention as defined by the following claims.

What is claimed is:

1. A servo track writer head for writing a plurality of servo tracks spaced across the width of a data storage tape as the tape moves along the head in a tape direction, each servo track written along a portion of the tape length, the servo track writer head comprising:
    a leading writer for each of the plurality of servo tracks, each leading writer operative to write a synchronization field on the tape at the same position in the tape direction as every other leading writer;
    a sequence of trailing writers for each of the plurality of servo tracks, each of the trailing writers operative to produce at least one trailing field on the tape, each trailing field to be written a fixed distance in the tape direction behind the synchronization field, each trailing writer at a particular location in the sequence of trailing writers positioned at the same distance in the tape direction from a selected leading writer as every other trailing writer at that particular location in the sequence of trailing writers;
    at least one timing writer, each timing writer operative to write a timing field on the tape at a timing distance in the tape direction from each of the plurality of synchronization fields; and
    a sequence of timing readers corresponding to each timing writer, each timing reader operative to read the timing field on the tape written by the corresponding timing writer, the number of timing readers in the sequence of timing readers equal to the number of trailing writers in the sequence of trailing writers, each timing reader at a particular location in the sequence of timing readers is located at the timing distance in the tape direction from a corresponding trailing writer having the same particular location in the sequence of trailing writers;
    thereby permitting locations of timing fields to be read and, hence, allowing the appropriate fixed distance behind synchronization fields for writing trailing fields to be determined.

2. A servo track writer head as in claim 1 wherein each synchronization field and each timing field is written simultaneously.

3. A servo track writer head as in claim 1 wherein the last trailing writer in each sequence of trailing writers is a track identification writer, each of the remaining trailing writers in each sequence of trailing writers is an erase writer, and each trailing field is an erased field.

4. A servo track writer head as in claim 3 wherein each of the remaining trailing writers comprises a first erase writer and a second erase writer.

5. A servo track writer head as in claim 1 wherein a first tape edge and a second tape edge define the tape width, the at least one timing writer comprising a first timing writer and a second timing writer, the first timing writer located closer than any leading writer to the first tape edge and the second timing writer located closer than any leading writer to the second tape edge.

6. A servo track writer head as in claim 1 wherein the fixed timing distance is zero, thereby aligning the start of each timing field with the start of each synchronization field along the tape length.

7. A servo track writer head as in claim 1 wherein each of the at least one timing writer is a thin film writer comprising:
    a bottom pole;
    a top pole;
    an insulating gap layer interposed between the bottom pole and the top pole; and
    a plurality of coils between the top pole and the bottom pole;
    wherein the bottom pole and the top pole form an electromagnet driven by current in the plurality of coils.

8. A servo track writer head as in claim 7 wherein at least one of the at least one trailing writer has a split top pole, each split top pole trailing writer operative to write at least two trailing fields simultaneously.

9. A servo track writer head as in claim 1 wherein each timing reader is one of a set comprising an inductive reader and a magnetoresistive reader.

10. A servo track writer head as in claim 1 wherein each timing writer and each leading writer are constructed on a single substrate and wherein each timing reader at a particular location in the sequence of timing readers and each trailing writer having the same particular location in the sequence of trailing writers are constructed on a single substrate.

11. A servo track writer head as in claim 1 wherein each timing writer is further operative to write the timing field at a first frequency and to write a second field following the timing field, the second field comprising a signal at a second frequency, and wherein each timing reader is further operative to detect the transition between the timing field and the second field and to detect periods of the second frequency signal, the number of periods detected used to determine the appropriate fixed distance behind synchronization fields for writing trailing fields.

12. A method for writing at least one servo track on a magnetic storage tape moving relative to a head, each servo track comprising a synchronization field followed by a sequence of trailing field patterns extending for a portion of the tape length, the method comprising:

writing a synchronization field on the tape for each servo track;

writing at least one timing field on the tape a fixed distance from a select synchronization field;

reading each of the at least one timing field from the tape;

writing a first trailing field pattern in the sequence on the tape for each servo track, each first trailing field pattern having a location based on when each of the at least one timing field is read; and repeating reading each of the at least one timing field and writing a next trailing field pattern in the sequence until each trailing field pattern in the sequence is written on the tape.

13. A method for writing at least one servo track as in claim 12 wherein a servo frame comprises a synchronization field followed by a sequence of trailing field patterns extending for a portion of the tape length, each servo track comprising a sequence of servo frames, the method further comprising repeating for each servo frame in the sequence of servo frames writing a synchronization field, writing at least one timing field, reading each of the at least one timing field, writing the next trailing field pattern, and repeating reading each of the at least one timing field and writing the next trailing field pattern in the sequence until each trailing field pattern in the sequence is written on the tape.

14. A method for writing at least one servo track as in claim 12 wherein the tape has a width defined by a first edge and a second edge, wherein the at least one servo track is a plurality of servo tracks, and wherein writing at least one timing field comprises writing a first timing field closer to the first edge than any of the plurality of servo tracks and writing a second timing field closer to the second edge than any of the plurality of servo tracks.

15. A method for writing at least one servo track as in claim 14 wherein the first timing field and the second timing field are written at the same located along the tape length, writing the next trailing field pattern in the sequence comprising:

determining a skew value as the difference between when the first timing field is read and when the second timing field is read; and writing at least one trailing field on the tape for each servo track, the location of each trailing field along the tape length based on the skew value.

16. A method for writing at least one servo track as in claim 12 wherein writing at least one timing field on the tape comprises:

writing a first timing field, the first timing field comprising a signal at a first frequency; and writing a second timing field following the first timing field, the second timing field comprising a signal at a second frequency.

17. A method for writing at least one servo track as in claim 16 wherein reading each of the at least one timing field from the tape comprises:

detecting the transition between the first timing field and the second timing field; and detecting each period of the second signal following the transition between the first timing field and the second timing field;

wherein the number of periods of the second signal following the transition between the first timing field and the second timing field is used to determine the location for writing the next trailing field pattern on the tape.

\* \* \* \* \*